United States Patent
Zhang et al.

(10) Patent No.: US 10,831,873 B2
(45) Date of Patent: Nov. 10, 2020

(54) METHOD FOR ENABLING BIOMETRIC RECOGNITION PATTERN AND RELATED PRODUCTS

(71) Applicant: Guangdong Oppo Mobile Telecommunications Corp., Ltd., Guangdong (CN)

(72) Inventors: Haiping Zhang, Guangdong (CN); Yibao Zhou, Guangdong (CN)

(73) Assignee: GUANGDONG OPPO MOBILE TELECOMMUNICATION CORP., LTD., Dongguan (CN)

(*) Notice: Subject to any disclaimer, the term of this patent is extended or adjusted under 35 U.S.C. 154(b) by 135 days.

(21) Appl. No.: 16/032,473

(22) Filed: Jul. 11, 2018

(65) Prior Publication Data

US 2019/0018943 A1 Jan. 17, 2019

(30) Foreign Application Priority Data

Jul. 11, 2017 (CN) .......................... 2017 1 0560610

(51) Int. Cl.
*G06F 21/32* (2013.01)
*G06F 3/01* (2006.01)
*G06K 9/00* (2006.01)
*H04L 29/06* (2006.01)
*H04W 12/06* (2009.01)
*G06Q 20/40* (2012.01)

(52) U.S. Cl.
CPC .............. *G06F 21/32* (2013.01); *G06F 3/011* (2013.01); *G06F 3/013* (2013.01); *G06F 3/017* (2013.01); *G06K 9/00087* (2013.01); *G06K 9/00892* (2013.01); *H04L 63/0861* (2013.01); *H04W 12/06* (2013.01); *G06Q 20/40145* (2013.01)

(58) Field of Classification Search
None
See application file for complete search history.

(56) References Cited

U.S. PATENT DOCUMENTS 10,303,869 B1 * 5/2019 Duke ...................... G06F 21/32
2003/0140234 A1 7/2003 Noda et al.
(Continued)

FOREIGN PATENT DOCUMENTS

| CN | 103761463 A | 4/2014 |
| CN | 103941876 A | 7/2014 |

(Continued)

OTHER PUBLICATIONS

Extended European search report issued in corresponding European application No. 18182260.2 dated Nov. 19, 2018.
(Continued)

*Primary Examiner* — Mohammed Rachedine (57) ABSTRACT

A method for enabling a biometric recognition pattern and related products are provided, and the method includes the follows. A mapping relationship between a first condition and a target biometric recognition pattern is queried when detecting that a terminal device satisfies the first condition. The target biometric recognition pattern is one or more of at least one biometric recognition pattern with which the terminal device is operable. The target biometric recognition pattern is determined based on the mapping relationship. The target biometric recognition pattern is enabled.

8 Claims, 5 Drawing Sheets

(56) References Cited

U.S. PATENT DOCUMENTS

2011/0167365 A1    7/2011   Wingrove et al.
2013/0212487 A1    8/2013   Cote
2013/0336545 A1   12/2013   Pritikin et al.
2017/0041314 A1    2/2017   Shin et al.

FOREIGN PATENT DOCUMENTS

| CN | 105590045 A | 5/2016 |
| CN | 105703909 A | 6/2016 |
| CN | 106022062 A | 10/2016 |
| CN | 106355063 A | 1/2017 |
| EP | 3142036 A1 | 3/2017 |
| WO | 2004100084 A1 | 11/2004 |

OTHER PUBLICATIONS

International search report issued in corresponding international application No. PCT/CN2018/094968 dated Sep. 26, 2018.

\* cited by examiner

METHOD FOR ENABLING BIOMETRIC RECOGNITION PATTERN AND RELATED PRODUCTS

CROSS-REFERENCE TO RELATED APPLICATION(S)

This application claims priority to Chinese Application Patent Serial No. 201710560610.0, filed on Jul. 11, 2017, the content of which is hereby incorporated by reference in its entirety.

TECHNICAL FIELD

The present disclosure relates to the field of mobile terminal technology, and particularly to a method for enabling a biometric recognition pattern and related products.

BACKGROUND

With development of smart phones, more and more applications are installed in user's mobile phones. People's lives, such as reading, payment, games, music, and the like, are inseparable from the mobile phones.

At present, operations, such as an unlocking process, a security authentication of the smart phones, and the like, are generally performed based on a single biometric recognition pattern, such as password authentication, fingerprint recognition, face recognition, and the like, and the smart phone will perform corresponding operations after a recognition process is successful.

SUMMARY

Implementations of the present disclosure provide a method for enabling a biometric recognition pattern and related products, which can improve intelligence of enabling a biometric recognition pattern by a mobile terminal with multiple biometric recognition patterns and facilitate users to use.

According to a first aspect of the implementations of the present disclosure, there is provided a terminal device. The terminal device includes a biometric-information receiving device, a processor, and a memory. The biometric-information receiving device is coupled with the processor, and the processor is coupled with the memory.

The processor is configured to: query a mapping relationship between a first condition and a target biometric recognition pattern when detecting that the terminal device satisfies the first condition, determine the target biometric recognition pattern based on the mapping relationship, and enable the target biometric recognition pattern. The target biometric recognition pattern is one or more of at least one biometric recognition pattern with which the terminal device is operable.

According to a second aspect of the implementations of the present disclosure, there is provided a method for enabling a biometric recognition pattern. The method includes the follows.

A mapping relationship between a first condition and a target biometric recognition pattern is queried when detecting that a terminal device satisfies the first condition. The target biometric recognition pattern is one or more of at least one biometric recognition pattern with which the terminal device is operable. The target biometric recognition pattern is determined based on the mapping relationship. The target biometric recognition pattern is enabled.

According to a third aspect of the implementations of the present disclosure, there is provided a non-transitory computer readable storage medium. The non-transitory computer-readable storage medium storing a computer program which, when executed by a processor, causes the processor to carry out actions of: querying a mapping relationship between a first condition and a target biometric recognition pattern when detecting that a terminal device satisfies the first condition, the target biometric recognition pattern being one or more of at least one biometric recognition pattern with which the terminal device is operable; determining the target biometric recognition pattern based on the mapping relationship; enabling the target biometric recognition pattern.

BRIEF DESCRIPTION OF THE DRAWINGS

In order to illustrate technical solutions of implementations of the present disclosure more clearly, the drawings used in the implementations will be briefly described below. It will be apparent that the drawings described in the following are merely some implementations of the present disclosure, and it will be apparent to those skilled in the art that other drawings can be obtained from the drawings without any creative work.

DETAILED DESCRIPTION

In order to enable those skilled in the art to better understand the solution of the present disclosure, technical solutions of the present disclosure will be described clearly and completely with reference to the accompanying drawings; obviously, the implementations described below are merely part of rather than all of the implementations of the present disclosure. Based on the implementations of the present disclosure, other implementations obtained therefrom without any creative work by those of ordinary skill in the art shall fall into the protection scope of the present disclosure.

The terms "first", "second" and the like in the specification and claims of the present disclosure and the drawings are used to distinguish different objects rather than describe a specific order. In addition, terms of "including" and "having" and any inflexions thereof are intended to cover a non-exclusive inclusions relationship. For example, processes, methods, systems, products, or devices containing a series of operations or units are not limitative to listed processes or units, other processes or units which are not listed can also be included, or other processes or units inherent to these processes, methods, products, or devices can also be included.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The terminal device involved in the implementations of the present disclosure may include various handheld devices having wireless communication functions, in-vehicle devices, wearable devices, computing devices or other processing devices connected to the wireless modem, as well as various forms of user equipment (UE), mobile stations (MS), terminal devices, and the like. For the convenience of description, the above-mentioned devices are collectively referred to as a terminal device.

The terminal device described in the implementations of the present disclosure is provided with a biometric-information receiving device. The biometric-information receiving device includes a fingerprint-information receiving device, an iris-information receiving device, and a face-information receiving device. The fingerprint-information receiving device can be a fingerprint sensor module. The iris-information receiving device can be a specialized iris camera module or a combined camera module integrated in a universal camera module. The face-information receiving device may be a universal camera module.

According to a first aspect of the implementations of the present disclosure, there is provided a terminal device. The terminal device includes a memory, a processor coupled with the memory, and a biometric-information receiving device coupled with the processor. The processor is configured to: query a mapping relationship between a first condition and a target biometric recognition pattern when detecting that the terminal device satisfies the first condition, the target biometric recognition pattern being one or more of at least one biometric recognition pattern with which the terminal device is operable, determine the target biometric recognition pattern based on the mapping relationship, and enable the target biometric recognition pattern.

In one implementation, the at least one biometric recognition pattern includes: a fingerprint recognition pattern, an iris recognition pattern, and a face recognition pattern.

In one implementation, the first condition is one of the following: gesture information of the terminal device matching preset gesture information; the terminal device detecting an unlocking request for a target event.

In one implementation, the processor is further configured to establish the mapping relationship between the first condition and the target biometric recognition pattern prior to enabling the target biometric recognition pattern.

In one implementation, the processor configured to establish the mapping relationship between the first condition and the target biometric recognition pattern is configured to: obtain historical usage data of the terminal device in a preset time period, the historical usage data including a usage frequency of each biometric recognition pattern with which the terminal device is operable, determine a biometric recognition pattern meeting a second condition and with a usage frequency larger than a first preset threshold as the target biometric recognition pattern, and establish the mapping relationship between the first condition and the target biometric recognition pattern.

In one implementation, the processor configured to establish the mapping relationship between the first condition and the target biometric recognition pattern is configured to: obtain a preset time period that a current moment falls into, determine a biometric recognition pattern meeting a second condition and with a usage frequency larger than a first preset threshold in the preset time period as the target biometric recognition pattern, and establish the mapping relationship between the first condition and the target biometric recognition pattern.

In one implementation, the historical usage data further includes a usage accuracy of each biometric recognition pattern and the second condition includes: the usage accuracy being larger than a second preset threshold.

According to a second aspect of the implementations of the present disclosure, there is provided a method for enabling a biometric recognition pattern. The method for enabling a biometric recognition pattern can include: querying a mapping relationship between a first condition and a target biometric recognition pattern when detecting that a terminal device satisfies the first condition, the target biometric recognition pattern being one or more of at least one biometric recognition pattern with which the terminal device is operable, determining the target biometric recognition pattern based on the mapping relationship, and enabling the target biometric recognition pattern.

In one implementation, the at least one biometric recognition pattern includes: a fingerprint recognition pattern, an iris recognition pattern, and a face recognition pattern.

In one implementation, the first condition is one of the following: gesture information of the terminal device matching preset gesture information, and the terminal device detecting an unlocking request for a target event.

In one implementation, the method further includes the follows prior to the enabling the target biometric recognition pattern: establishing the mapping relationship between the first condition and the target biometric recognition pattern.

In one implementation, the establishing the mapping relationship between the first condition and the target biometric recognition pattern includes: obtaining historical usage data of the terminal device in a preset time period, the historical usage data including a usage frequency of each biometric recognition pattern with which the terminal device is operable, determining a biometric recognition pattern meeting a second condition and with a usage frequency larger than a first preset threshold as the target biometric recognition pattern, and establishing the mapping relationship between the first condition and the target biometric recognition pattern.

In one implementation, the establishing the mapping relationship between the first condition and the target biometric recognition pattern includes: obtaining a preset time period that a current moment falls into, determining a biometric recognition pattern meeting a second condition and with a usage frequency larger than a first preset threshold in the preset time period as the target biometric recognition pattern, and establishing the mapping relationship between the first condition and the target biometric recognition pattern.

In one implementation, the historical usage data further includes a usage accuracy of each biometric recognition pattern and the second condition includes: the usage accuracy being larger than a second preset threshold.

According to a third aspect of the implementations of the present disclosure, there is provided a non-transitory computer-readable storage medium storing a computer program which, when executed by a processor, causes the processor to carry out actions: querying a mapping relationship between a first condition and a target biometric recognition pattern when detecting that a terminal device satisfies the first condition, the target biometric recognition pattern being one or more of at least one biometric recognition pattern with which the terminal device is operable, determining the target biometric recognition pattern based on the mapping relationship, and enabling the target biometric recognition pattern.

In one implementation, the at least one biometric recognition pattern includes: a fingerprint recognition pattern, an iris recognition pattern, and a face recognition pattern.

In one implementation, the first condition is one of the following: gesture information of the terminal device matching preset gesture information, and the terminal device detecting an unlocking request for a target event.

In one implementation, the computer program is further executed by the processor to carry out actions, including: establishing the mapping relationship between the first condition and the target biometric recognition pattern.

In one implementation, the computer program executed by the processor to carry out the action of establishing the mapping relationship between the first condition and the target biometric recognition pattern is executed by the processor to carry out actions, including: obtaining historical usage data of the terminal device in a preset time period, the historical usage data including a usage frequency of each biometric recognition pattern with which the terminal device is operable; determining a biometric recognition pattern meeting a second condition and with a usage frequency larger than a first preset threshold as the target biometric recognition pattern; and establishing the mapping relationship between the first condition and the target biometric recognition pattern.

In one implementation, the computer program executed by the processor to carry out the action of establishing the mapping relationship between the first condition and the target biometric recognition pattern is executed by the processor to carry out actions, including: obtaining a preset time period that a current moment falls into, determining a biometric recognition pattern meeting a second condition and with a usage frequency larger than a first preset threshold in the preset time period as the target biometric recognition pattern, and establishing the mapping relationship between the first condition and the target biometric recognition pattern.

In order to better understand a method for enabling a biometric recognition pattern and related products provided in the implementations of the present disclosure, the implementations of the present disclosure will be described in detail in the following.

Figure 1:
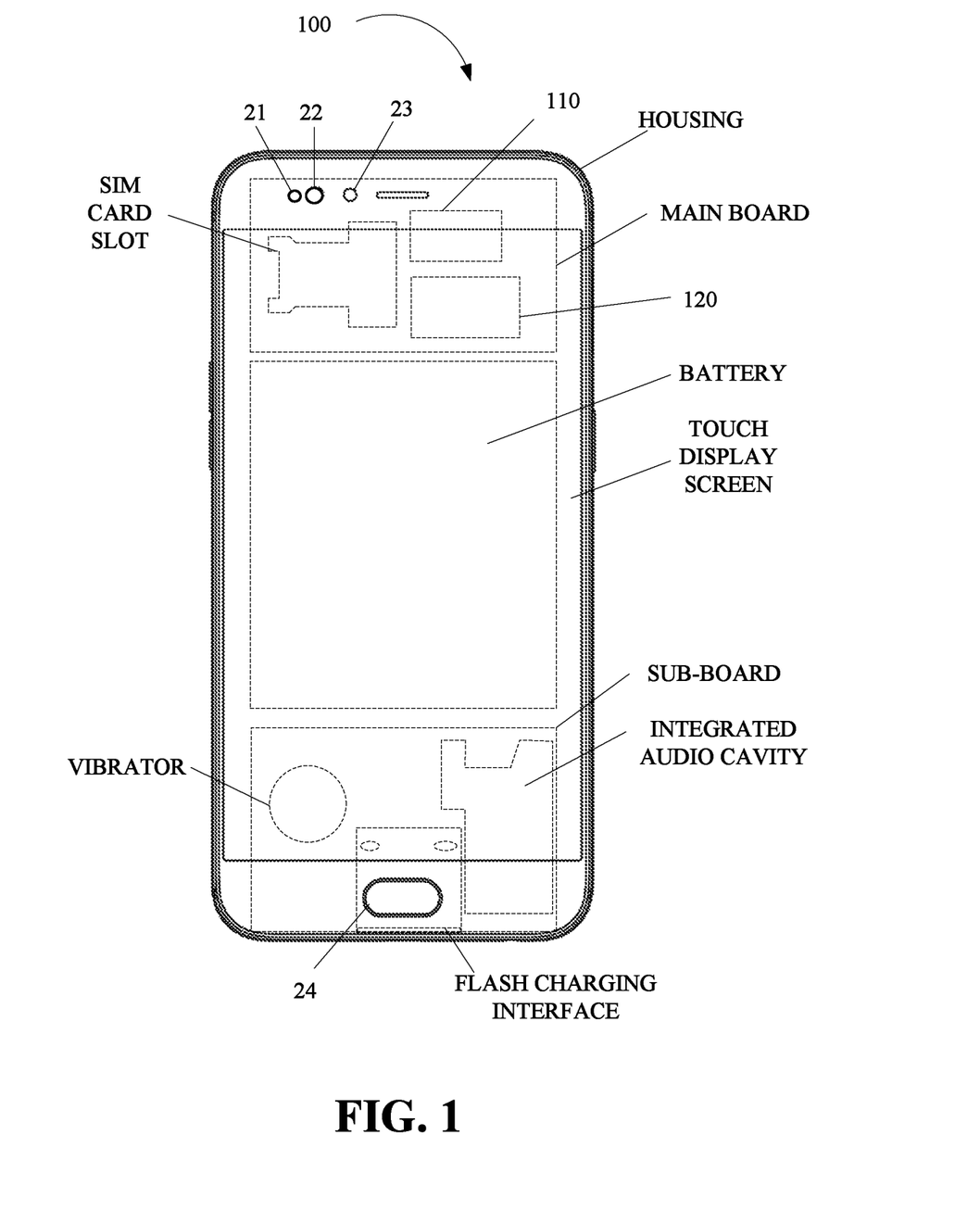
FIG. 1 is a schematic structural diagram illustrating a terminal device according to an implementation of the present disclosure.

Referring to FIG. 1, FIG. 1 is a schematic structural diagram illustrating a terminal device 100 according to an implementation of the present disclosure. The terminal device 100 includes a housing, a touch display screen, a main board, a battery, and a sub-board. The main board is provided with an infrared light 21, an infrared camera 22, a front-facing camera 23, a processor 110, a memory 120, a subscriber identification module (SIM) card slot, and the like. The sub-board is provided with a vibrator, an integrated audio cavity, a VOOC flash charging interface, and a fingerprint sensor module 24. The infrared light 21 and the infrared camera 22 constitute the iris-information receiving device of the terminal device 100, the front-facing camera 23 constitutes the face-information receiving device of the terminal device 100, and the fingerprint sensor module 24 constitutes the fingerprint-information receiving device of the terminal device 100. The above-mentioned iris-information receiving device, face-information receiving device, and fingerprint-information receiving device are collectively referred to as a biometric-information receiving device of the terminal device 100.

The processor 110 is configured to: query a mapping relationship between a first condition and a target biometric recognition pattern(s) when detecting that the terminal device satisfies the first condition, determine the target biometric recognition pattern based on the mapping relationship, and enable the target biometric recognition pattern. The target biometric recognition pattern is one or more of at least one biometric recognition pattern with which the terminal device is operable, that is, one or more of at least one biometric recognition pattern supported by the terminal device.

The memory 120 is configured to store the mapping relationship between the first condition and the target biometric recognition pattern.

The biometric-information receiving device is configured to receive at least one kind of biometric information enrolled by a user.

In one implementation, the biometric-information receiving device is the iris-information receiving device. The infrared light 21 is configured to emit infrared light to illuminate the user's iris to form reflected light. The infrared camera 22 is configured to collect the reflected light to form an iris image. The infrared camera 22 is further configured to send the iris image to the processor 110. The processor 110 is configured to perform processes on the iris image after obtaining the iris image, such as iris image quality evaluation, iris region positioning (including coarse positioning and fine positioning), iris preprocessing, iris feature point extraction, and iris template generation. The generated iris template is the above-mentioned biometric information.

In one implementation, the biometric-information receiving device is the face-information receiving device. The front-facing camera 23 is configured to collect the user's facial image. The front-facing camera 23 is further configured to send the user's facial image to the processor 110. The processor 110 is configured to pre-process the facial image and extract facial feature points to form a facial template, after obtaining the facial image. The facial template is the above-mentioned biometric information.

In one implementation, the biometric-information receiving device is the fingerprint-information receiving device. The fingerprint sensor module 24 is configured to collect the user's fingerprint image. The front-facing camera 23 is further configured to send the user's fingerprint image to the processor 110. The processor 110 is configured to preprocess the fingerprint image and extract fingerprint feature points to form a fingerprint template, after obtaining the fingerprint image. The fingerprint template is the above-mentioned biometric information.

As can be seen, when the terminal device detects that the terminal device satisfies the first condition, the terminal device queries the mapping relationship between the first condition and the target biometric recognition pattern. The target biometric recognition pattern is one or more of at least one biometric recognition pattern with which the terminal device is operable. Then the terminal device determines the target biometric recognition pattern based on the mapping relationship and enables the target biometric recognition pattern. It can be seen that, in the implementations of the present disclosure, the terminal device can enable the target biometric recognition pattern directly when detecting that the terminal device satisfies the first condition, which is possible to improve intelligence of enabling a biometric recognition pattern by a terminal device with multiple biometric recognition patterns and facilitate users to use; meanwhile, a high power consumption of the terminal device caused by multiple biometric recognition patterns in a working state can be avoided and battery life of the terminal device can be prolonged.

In some possible implementations, the terminal device is operable with the following at least one biometric recognition pattern: a fingerprint recognition pattern, an iris recognition pattern, and a face recognition pattern.

In some possible implementations, the first condition is that gesture information of the terminal device matches preset gesture information. Alternatively, the first condition is that the terminal device detects an unlocking request for a target event.

In some possible implementations, the processor 110 is further configured to establish the mapping relationship between the first condition and the target biometric recognition pattern prior to enabling the target biometric recognition pattern.

In some possible implementations, in terms of establishing the mapping relationship between the first condition and the target biometric recognition pattern, the processor 110 is configured to: obtain historical usage data of the terminal device in a preset time period, determine a biometric recognition pattern meeting a second condition and with a usage frequency larger than a first preset threshold, use the determined biometric recognition pattern as the target biometric recognition pattern, and establish the mapping relationship between the first condition and the target biometric recognition pattern. The historical usage data includes a usage frequency of each biometric recognition pattern with which the terminal device is operable.

In some possible implementations, in terms of establishing the mapping relationship between the first condition and the target biometric recognition pattern, the processor 110 is configured to: obtain a preset time period that a current moment falls into, obtain a biometric recognition pattern with a usage frequency larger than a first preset threshold, determine a biometric recognition pattern meeting a second condition and with the usage frequency larger than the first preset threshold, use the determined biometric recognition pattern as the target biometric recognition pattern, and establish the mapping relationship between the first condition and the target biometric recognition pattern.

In some possible implementations, the historical usage data further includes a usage accuracy of each biometric recognition pattern and the second condition includes that the usage accuracy is larger than a second preset threshold.

Figure 2:
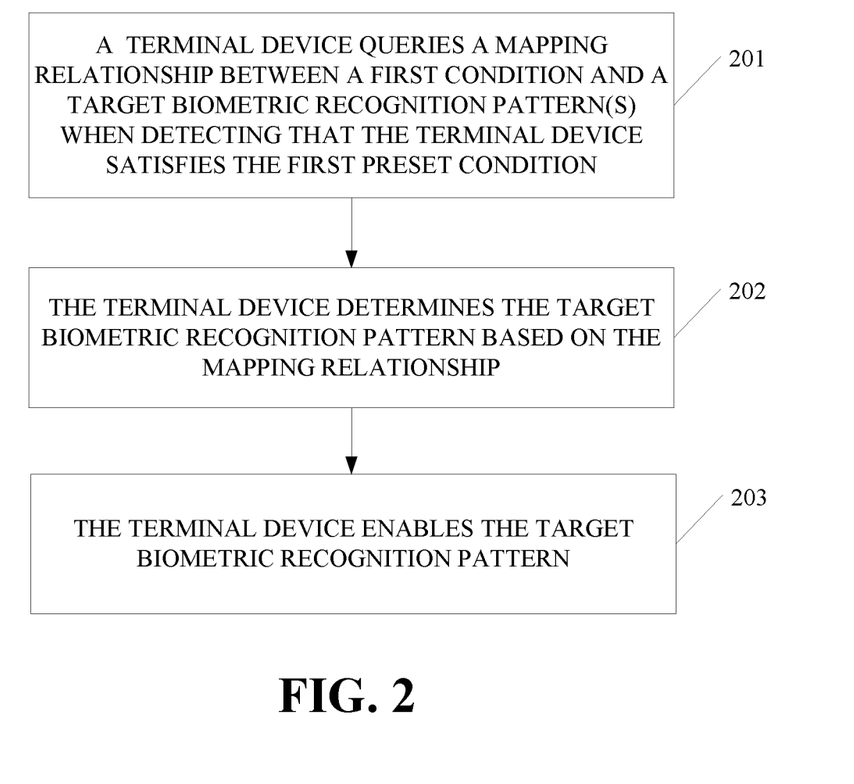
FIG. 2 is a schematic flow chart illustrating a method for enabling a biometric recognition pattern according to an implementation of the present disclosure.

Referring to FIG. 2, FIG. 2 is a schematic flow chart illustrating a method for enabling a biometric recognition pattern according to an implementation of the present disclosure. As illustrated in FIG. 2, the method for enabling a biometric recognition pattern starts with operations at block 201.

At block 201, a terminal device queries a mapping relationship between a first condition and a target biometric recognition pattern(s) when detecting that the terminal device satisfies the first condition. The target biometric recognition pattern is one or more of at least one biometric recognition pattern with which the terminal device is operable.

The terminal device is operable with at least one of the following biometric recognition patterns: a fingerprint recognition pattern, an iris recognition pattern, and a face recognition pattern.

The first condition is that gesture information of the terminal device matches preset gesture information. Alternatively, the first condition is that the terminal device detects an unlocking request for a target event. The first condition can be user-defined or set by a system automatically.

In one implementation, the preset gesture information can include a preset angle range with respect to the horizontal plane, a preset acceleration range, shaking times in a preset time period, and so on, and the present disclosure is not limited thereto.

In one implementation, detecting that the terminal device satisfies the first condition includes detecting that the gesture information of the terminal device matches the preset gesture information or detecting the unlocking request for the target event. The unlocking request for the target event can be, for example, a desktop unlocking request, an application unlocking request, a file unlocking request, a payment authentication request, and the present disclosure is not limited thereto. The desktop unlocking request refers to an unlocking request for a lock-screen desktop. The application unlocking request refers to an unlocking request for specific operations of the application, such as application startup, application deletion, etc. The unlocking request for a file refers to an unlocking request for a target file. The payment authentication request refers to an authentication request when applications such as Alipay® and mobile banking are enabled, such as when paying with Alipay, or transferring money with the mobile banking.

The unlocking request for the target event can be triggered specifically by the user's touch operation, press operation, voice operation and the like, and can also be triggered by a current interface of the terminal device. For example, when detecting a hand-held operation of the terminal device in a screen-off and standby state, the operation can be considered as the unlocking request for the desktop. As another example, when the terminal device is in a payment interface, the payment interface can be considered as the detection of the payment authentication request. The triggering condition is not limited herein.

As can be seen, the operation of querying the mapping relationship between the first condition and the target biometric recognition pattern will not be performed until detecting that the terminal device satisfies the first condition, which can avoid a large power consumption caused by querying the mapping relationship between the first condition and the target biometric recognition pattern in real time.

At block 202, the terminal device determines the target biometric recognition pattern based on the mapping relationship.

Specifically, the target biometric recognition pattern can be a biometric recognition pattern with a highest usage frequency in a preset time period, a biometric recognition pattern with a highest usage accuracy in a preset time period, or a biometric recognition pattern with a usage frequency larger than a first preset threshold and a usage accuracy larger than a second preset threshold.

At block 203, the terminal device enables the target biometric recognition pattern.

As can be seen, when the terminal device detects that the terminal device satisfies the first condition, the terminal device queries the mapping relationship between the first condition and the target biometric recognition pattern. The target biometric recognition pattern is one or more of at least one biometric recognition pattern with which the terminal device is operable. Then the terminal device determines the target biometric recognition pattern based on the mapping relationship and enables the target biometric recognition pattern. It can be seen that, in the implementations of the present disclosure, the terminal device can enable the target biometric recognition pattern directly when detecting that the terminal device satisfies the first condition, it is possible to improve intelligence of enabling a biometric recognition pattern by a terminal device with multiple biometric recognition patterns and facilitate users to use; meanwhile, a high power consumption of the terminal device caused by multiple biometric recognition patterns in a working state can be avoided and battery life of the terminal device can be prolonged.

In some possible implementations, the terminal device can establish the mapping relationship between the first condition and the target biometric recognition pattern, prior to enabling the target biometric recognition pattern.

The terminal device can establish the mapping relationship between the first condition and the target biometric recognition pattern in advance, and then queries the mapping relationship between the first condition and the target biometric recognition pattern when detecting that the terminal device satisfies the first condition. Or the terminal device can also establish the mapping relationship between the first condition and the target biometric recognition pattern when detecting that the terminal device satisfies the first condition, and then queries the mapping relationship between the first condition and the target biometric recognition pattern.

As can be seen, the terminal device can establish the mapping relationship between the first condition and the target biometric recognition pattern in advance, then determine the target biometric recognition pattern to be enabled and enable the target biometric recognition pattern. Thus, it is possible to improve intelligence of enabling a biometric recognition pattern by a terminal device with multiple biometric recognition patterns and facilitate the user to use.

In some possible implementations, the terminal device can further perform the following operations prior to enabling the target biometric recognition pattern.

The terminal device obtains historical usage data of the terminal device in a preset time period. The historical usage data includes a usage frequency of each biometric recognition pattern with which the terminal device is operable.

The terminal device determines a biometric recognition pattern meeting a second condition and with a usage frequency larger than a first preset threshold as the target biometric recognition pattern.

The terminal device establishes the mapping relationship between the first condition and the target biometric recognition pattern.

Specifically, the terminal device studies the historical usage data in the preset time period (for example, 6 months or 12 months). The historical usage data includes the usage frequency of each biometric recognition pattern with which the terminal device is operable. For example, the historical usage data of the terminal device in 6 months is counted, in which the user used the fingerprint recognition pattern 1000 times, the iris recognition pattern 200 times, and the face recognition pattern 50 times. The terminal device can determine that the user has a tendency to use the fingerprint recognition pattern according to a personal usage habit of the user, then determine the fingerprint recognition pattern as the target recognition pattern and establish the mapping relationship between the first condition and the fingerprint recognition pattern. When detecting that the terminal device satisfies the first condition, the fingerprint recognition is enabled directly to facilitate the user to use.

The biometric recognition pattern meeting the second condition and with the usage frequency larger than the first preset threshold is determined as the target biometric recognition pattern. The second condition can be unconditional, or the second condition is that a usage accuracy is larger than a second preset threshold.

In some possible implementations, the mapping relationship between the first condition and the target biometric recognition pattern can be established as follows.

A preset time period that a current moment falls into is obtained.

A biometric recognition pattern with a usage frequency larger than a first preset threshold is obtained.

A biometric recognition pattern meeting a second condition and with the usage frequency larger than the first preset threshold is determined as the target biometric recognition pattern.

The mapping relationship between the first condition and the target biometric recognition pattern is established.

Specifically, when detecting that the terminal device satisfies the first condition, the terminal device obtains the preset time period that the current moment falls into. Different time periods correspond to different usage habits of the user and different external environments (such as light, etc.). For example, in the afternoon, the user is prone to sweating or the skin tends to be oily, the accuracy of fingerprint recognition may be reduced, thus, in this preset time period, the user prefers to use face recognition or iris recognition. Therefore, the terminal device establishes a mapping relationship between the first condition and the fingerprint recognition pattern. For another example, in the evening, as ambient light is dark and the accuracy of face recognition is low, and the user prefers to use the fingerprint recognition pattern or the iris recognition pattern. Therefore, the terminal device establishes a mapping relationship between the first condition and the fingerprint recognition pattern or the iris recognition pattern.

For example, the terminal device determines three time periods in advance: {6:00 to 12:00}, {12:00 to 17:00}, and {17:00 to 22:00}. In one implementation, the terminal device detects that the current moment falls into the preset time period {12:00 to 17:00}; in this time period, a pre-stored biometric recognition pattern with the usage frequency larger than the first preset threshold is the fingerprint recognition pattern, therefore, the terminal device establishes the mapping relationship between the first condition and the fingerprint recognition pattern. In one implementation, the terminal device detects that the current moment falls into the preset time period {17:00 to 22:00}; in this time period, a pre-stored biometric recognition pattern with the usage frequency larger than the first preset threshold is the iris recognition pattern, therefore, the terminal device establishes the mapping relationship between the first condition and the iris recognition pattern.

In some possible implementations, the historical usage data further includes a usage accuracy of each biometric recognition pattern and the second condition includes that the usage accuracy is larger than a second preset threshold.

As can be seen, when determining the target fingerprint recognition pattern, in addition to the usage frequency, the usage accuracy is also taken into consideration. Based on the usage frequency and the usage accuracy, a biometric recognition pattern that the user prefers to use and with a higher recognition accuracy is determined as the target biometric recognition pattern, which is possible to be more in line with the user's individual needs and improve the recognition speed when the user performs recognition.

There can be a plurality of manners in which the terminal device establishes the mapping relationship between the first condition and the target biometric recognition pattern, which will be described in detail with reference to FIG. 3 to FIG. 4.

Figure 3:
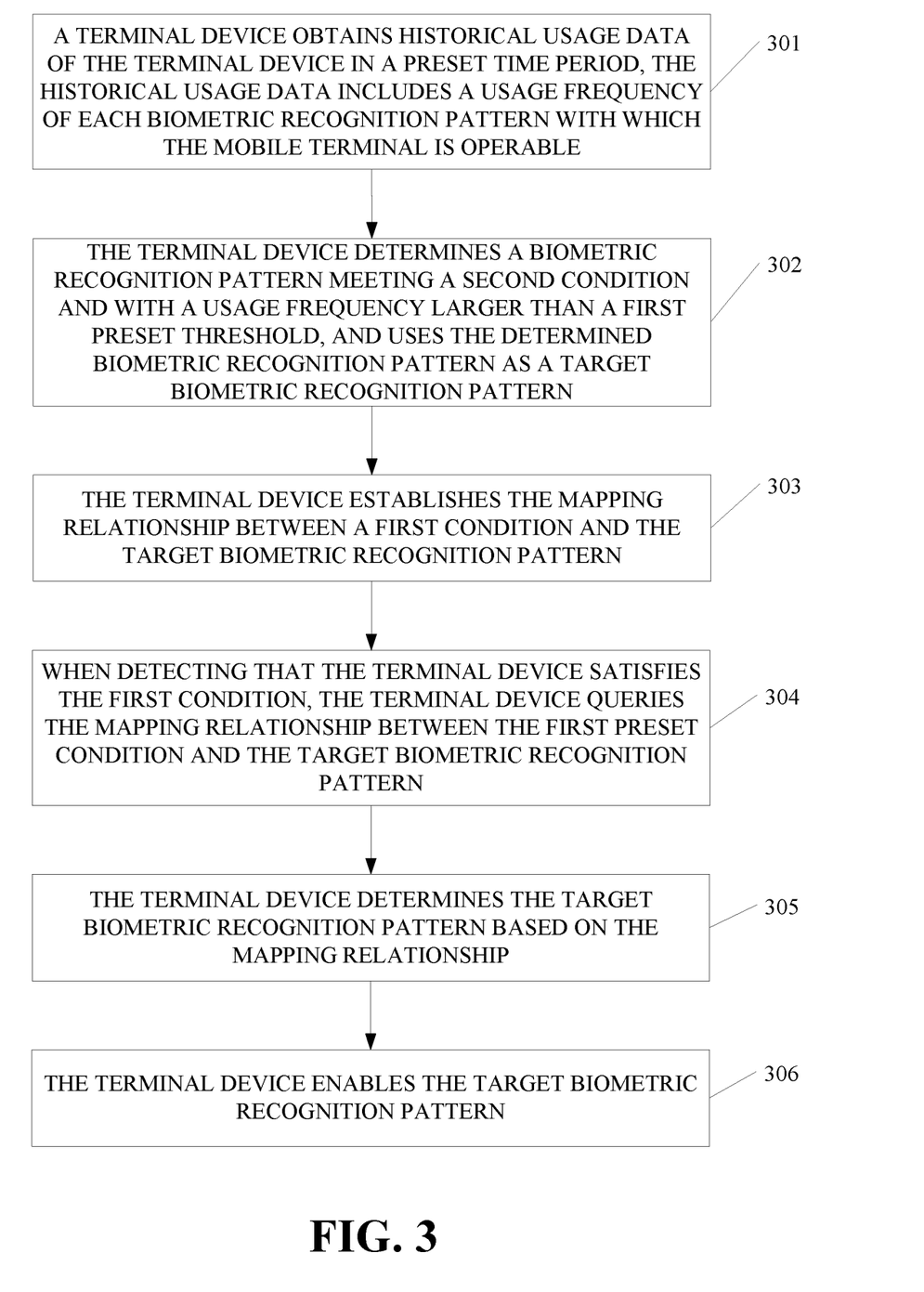
FIG. 3 is a schematic flow chart illustrating a method for enabling a biometric recognition pattern according to an implementation of the present disclosure.

Similar with the implementation illustrated in FIG. 2, referring to FIG. 3, FIG. 3 is a schematic flow chart illustrating a method for enabling a biometric recognition pattern according to an implementation of the present disclosure. As illustrated in FIG. 3, the method for enabling a biometric recognition pattern begins at operations at block 301.

At block 301, a terminal device obtains historical usage data of the terminal device in a preset time period. The historical usage data includes a usage frequency of each biometric recognition pattern with which the terminal device is operable.

At block 302, the terminal device determines a biometric recognition pattern meeting a second condition and with a usage frequency larger than a first preset threshold, and uses the determined biometric recognition pattern as a target biometric recognition pattern.

The historical usage data further includes a usage accuracy of each biometric recognition pattern and the second condition includes that the usage accuracy is larger than a second preset threshold.

At block 303, the terminal device establishes the mapping relationship between a first condition and the target biometric recognition pattern.

At block 304, when detecting that the terminal device satisfies the first condition, the terminal device queries the mapping relationship between the first condition and the target biometric recognition pattern. The target biometric recognition pattern is one or more of at least one biometric recognition pattern with which the terminal device is operable.

At block 305, the terminal device determines the target biometric recognition pattern based on the mapping relationship.

At block 306, the terminal device enables the target biometric recognition pattern.

As can be seen, when the terminal device detects that the terminal device satisfies the first condition, the terminal device queries the mapping relationship between the first condition and the target biometric recognition pattern. The target biometric recognition pattern is one or more of at least one biometric recognition pattern with which the terminal device is operable. Then the terminal device determines the target biometric recognition pattern based on the mapping relationship and enables the target biometric recognition pattern. It can be seen that, in the implementations of the present disclosure, the terminal device can enable the target biometric recognition pattern directly when detecting that the terminal device satisfies the first condition, which is possible to improve intelligence of enabling a biometric recognition pattern by a terminal device with multiple biometric recognition patterns and facilitate users to use; meanwhile, a high power consumption of the terminal device caused by multiple biometric recognition patterns in a working state can be avoided and battery life of the terminal device can be prolonged.

Figure 4:
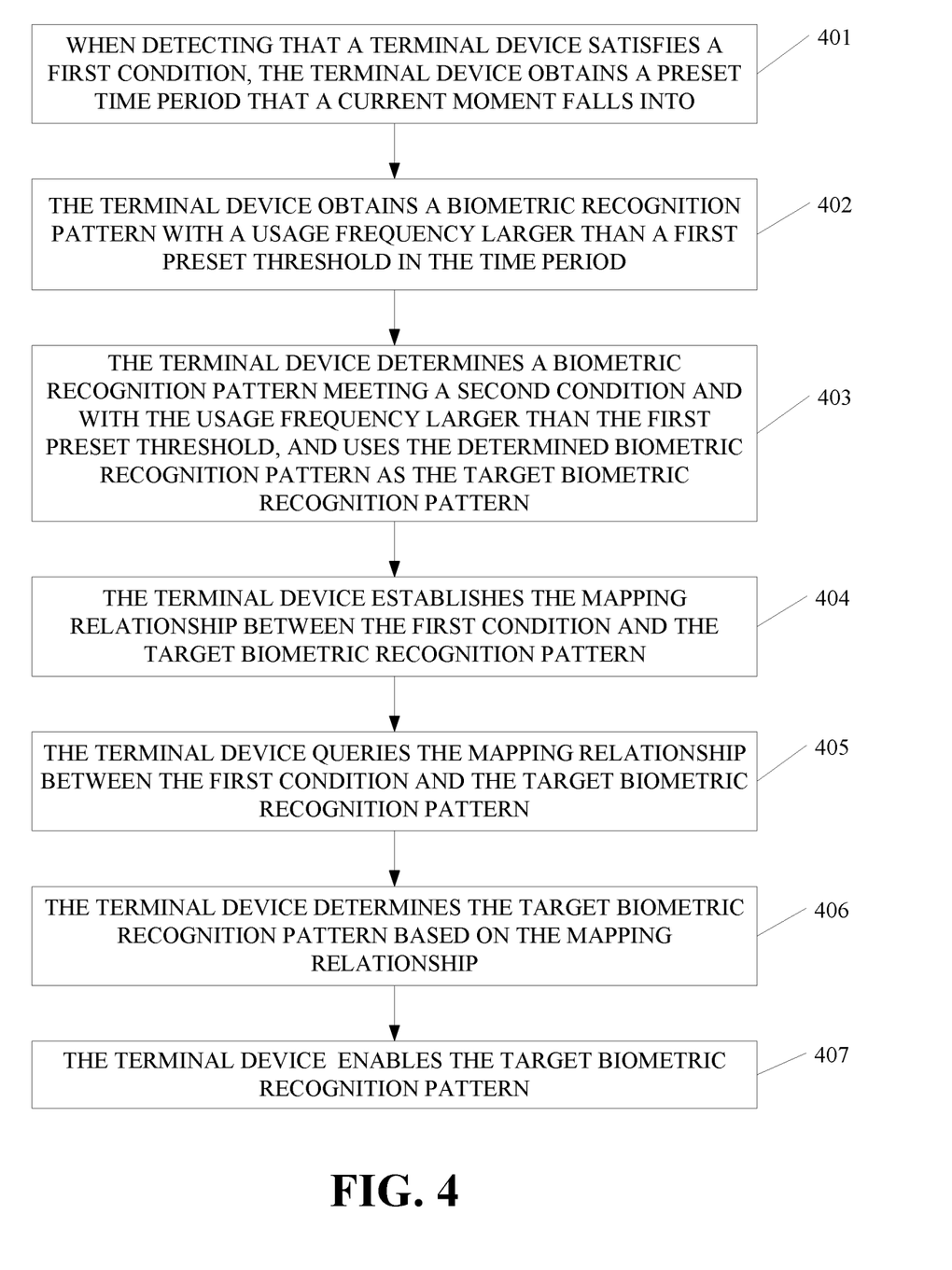
FIG. 4 is a schematic flow chart illustrating a method for enabling a biometric recognition pattern according to an implementation of the present disclosure.

In addition to the method of FIG. 3, FIG. 4 provides another implementation for the mapping relationship establishing operation of the method for enabling a biometric recognition pattern. In FIG. 3, mapping relationship establishing is performed in advance based on a usage frequency of each biometric recognition pattern. In FIG. 4, the mapping relationship establishing will be performed based on a usage frequency of each biometric recognition pattern and a time period when detecting that the terminal device satisfies the first condition.

Similar with the implementations illustrated in FIG. 2 and FIG. 3, referring to FIG. 4, FIG. 4 is a schematic flow chart illustrating a method for enabling a biometric recognition pattern according to an implementation of the present disclosure. As illustrated in FIG. 4, the method for enabling a biometric recognition pattern begins at operations at block 401.

At block 401, when detecting that a terminal device satisfies a first condition, the terminal device obtains a preset time period that a current moment falls into.

At block 402, the terminal device obtains a biometric recognition pattern(s) with a usage frequency larger than a first preset threshold in the preset time period.

At block 403, the terminal device determines a biometric recognition pattern meeting a second condition and with the usage frequency larger than the first preset threshold, and uses the determined biometric recognition pattern as the target biometric recognition pattern.

The second condition includes that a usage accuracy is larger than a second preset threshold.

At block 404, the terminal device establishes the mapping relationship between the first condition and the target biometric recognition pattern.

At block 405, the terminal device queries the mapping relationship between the first condition and the target biometric recognition pattern. The target biometric recognition pattern is one or more of at least one biometric recognition pattern with which the terminal device is operable.

At block 406, the terminal device determines the target biometric recognition pattern based on the mapping relationship.

At block 407, the terminal device enables the target biometric recognition pattern.

As can be seen, when the terminal device detects that the terminal device satisfies the first condition, the terminal device queries the mapping relationship between the first condition and the target biometric recognition pattern. The target biometric recognition pattern is one or more of at least one biometric recognition pattern with which the terminal device is operable. Then the terminal device determines the target biometric recognition pattern based on the mapping relationship and enables the target biometric recognition pattern. It can be seen that, in the implementations of the present disclosure, the terminal device can enable the target biometric recognition pattern directly when detecting that the terminal device satisfies the first condition, which is possible to improve intelligence of enabling a biometric recognition pattern by a terminal device with multiple biometric recognition patterns and facilitate users to use; meanwhile, a high power consumption of the terminal device caused by multiple biometric recognition patterns in a working state can be avoided and battery life of the terminal device can be prolonged.

Figure 5:
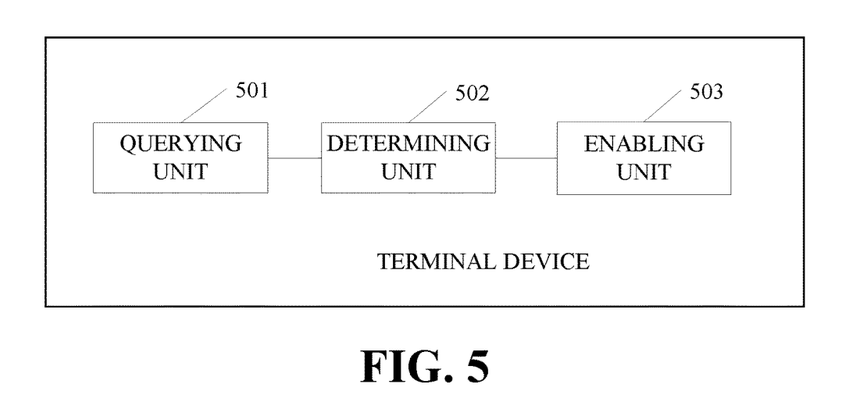
FIG. 5 is a schematic block diagram illustrating functional units of a terminal device according to an implementation of the present disclosure.

The followings are apparatus implementations of the present disclosure, which are configured to implement the method of the method implementations of the present disclosure. Referring to FIG. 5. FIG. 5 is a schematic block diagram illustrating functional units of a terminal device according to an implementation of the present disclosure. As illustrated in FIG. 5, the terminal device in the implementations of the present disclosure can include a querying unit 501, a determining unit 502, and an enabling unit 503.

The querying unit 501 is configured to query a mapping relationship between a first condition and a target biometric recognition pattern, when detecting that the terminal device satisfies the first condition. The target biometric recognition pattern is one or more of at least one biometric recognition pattern supported by the terminal device.

The determining unit 502 is configured to determine the target biometric recognition pattern based on the mapping relationship.

The enabling unit 503 is configured to enable the target biometric recognition pattern.

As can be seen, when the terminal device detects that the terminal device satisfies the first condition, the terminal device queries the mapping relationship between the first condition and the target biometric recognition pattern. The target biometric recognition pattern is one or more of at least one biometric recognition pattern with which the terminal device is operable. Then the terminal device determines the target biometric recognition pattern based on the mapping relationship and enables the target biometric recognition pattern. It can be seen that, in the implementations of the present disclosure, the terminal device can enable the target biometric recognition pattern directly when detecting that the terminal device satisfies the first condition, which is possible to improve intelligence of enabling a biometric recognition pattern by a terminal device with multiple biometric recognition patterns and facilitate users to use; meanwhile, a high power consumption of the terminal device caused by multiple biometric recognition patterns in a working state can be avoided and battery life of the terminal device can be prolonged.

Figure 6:
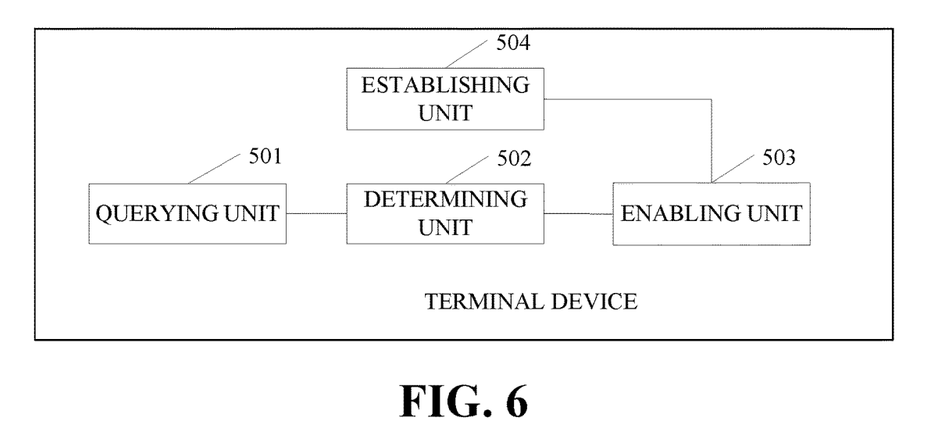
FIG. 6 is a schematic block diagram illustrating functional units of a terminal device according to an implementation of the present disclosure.

Referring to FIG. 6. FIG. 6 is a schematic block diagram illustrating functional units of another terminal device according to an implementation of the present disclosure. As illustrated in FIG. 6, the terminal device in the implementations of the present disclosure can include the querying unit 501, the determining unit 502, and the enabling unit 503 in the implementation corresponding to FIG. 5.

In an implementation, the terminal device is operable with at least one of the following biometric recognition patterns: a fingerprint recognition pattern, an iris recognition pattern, and a face recognition pattern.

In an implementation, the first condition is that gesture information of the terminal device matches preset gesture information. Or the first condition is that the terminal device detects an unlocking request for a target event.

In an implementation, the terminal device can further include an establishing unit 504.

The establishing unit 504 is configured to establish the mapping relationship between the first condition and the target biometric recognition pattern.

In an implementation, the establishing unit 504 is further configured to: obtain historical usage data of the terminal device in a preset time period, determine a biometric recognition pattern meeting a second condition and with a usage frequency larger than a first preset threshold as the target biometric recognition pattern, and establish the mapping relationship between the first condition and the target biometric recognition pattern. The historical usage data includes a usage frequency of each biometric recognition pattern with which the terminal device is operable.

In an implementation, the establishing unit 504 is further configured to: obtain a preset time period that a current moment falls into, obtain a biometric recognition pattern with a usage frequency larger than a first preset threshold, determine a biometric recognition pattern meeting a second condition and with the usage frequency larger than the first preset threshold as the target biometric recognition pattern, and establish the mapping relationship between the first condition and the target biometric recognition pattern.

In an implementation, the historical usage data further includes a usage accuracy of each biometric recognition pattern and the second condition includes that the usage accuracy is larger than a second preset threshold.

Specifically, specific implementations of the each above-mentioned unit can refer to descriptions of related procedures of the implementations corresponding to FIG. 2, FIG. 3, and FIG. 4, which will not be described in detail herein.

It is to be noted that, the mobile terminal described in the device implementation of the disclosure is presented in the form of functional units. The term "unit" used herein should be understood as the broadest meaning as possible, and an object for implementing functions defined by each "unit" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

Figure 7:
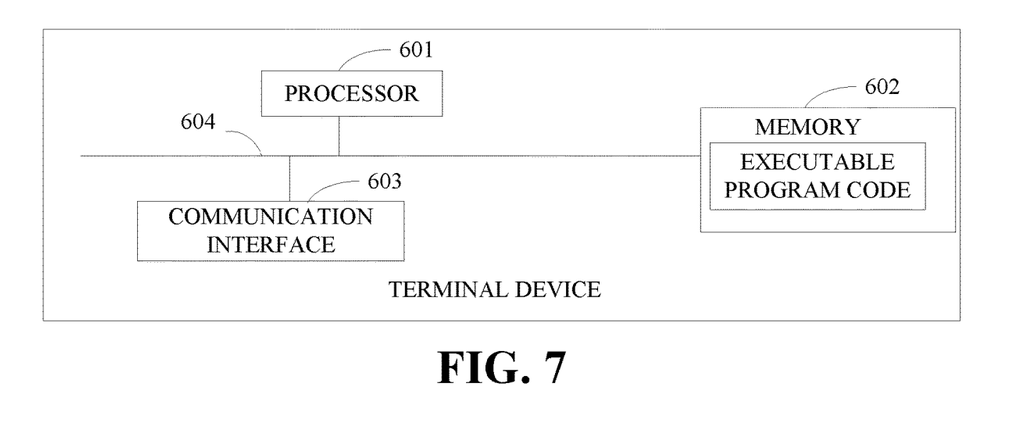
FIG. 7 is a schematic structural diagram illustrating a terminal device according to an implementation of the present disclosure.

For example, the function of the above-mentioned query unit 501 configured to query the mapping relationship between the first condition and the target biometric recognition pattern when detecting that the terminal device satisfies the first condition can be implemented by the terminal device illustrated in FIG. 7. Specifically, the processor 101 may invoke the executable program code in the memory 102 to query the mapping relationship between the first condition and the target biometric recognition pattern when detecting that the terminal device satisfies the first condition.

As can be seen, when the terminal device detects that the terminal device satisfies the first condition, the terminal device queries the mapping relationship between the first condition and the target biometric recognition pattern. The target biometric recognition pattern is one or more of at least one biometric recognition pattern with which the terminal device is operable. Then the terminal device determines the target biometric recognition pattern based on the mapping relationship and enables the target biometric recognition pattern. It can be seen that, in the implementations of the present disclosure, the terminal device can enable the target biometric recognition pattern directly when detecting that the terminal device satisfies the first condition, which is possible to improve intelligence of enabling a biometric recognition pattern by a terminal device with multiple biometric recognition patterns and facilitate users to use; meanwhile, a high power consumption of the terminal device caused by multiple biometric recognition patterns in a working state can be avoided and battery life of the terminal device can be prolonged.

The implementations of the present disclosure also provide a terminal device. As illustrated in FIG. 7, the terminal device includes a processor 601, a memory 602, a communication interface 603, and a communication bus 604. The processor 601, the memory 602, and the communication interface 603 are connected and complete communication with each other through the communication bus 604. The processor 601 controls wireless communication with an external cellular network through the communication interface 603. The communication interface 603 can include but limit to an antenna, an amplifier, a transceiver, a coupler, a low noise amplifier (LNA), a duplexer, etc. The memory 602 includes at least one of the followings: a random access memory (RAN), a non-volatile memory, and an external memory. The memory 602 is configured to store executable program code. The executable program code can guide the processor 601 to execute the method for enabling a biometric recognition pattern provided in the method implementations of the present disclosure.

The processor 601 is configured to: query a mapping relationship between a first condition and a target biometric recognition pattern when detecting that the terminal device satisfies the first condition, determine the target biometric recognition pattern based on the mapping relationship, and enable the target biometric recognition pattern. The target biometric recognition pattern is one or more of at least one biometric recognition pattern with which the terminal device is operable.

In an implementation, the terminal device is operable with at least one of the following biometric recognition patterns: a fingerprint recognition pattern, an iris recognition pattern, and a face recognition pattern.

In an implementation, the first condition is that gesture information of the terminal device matches preset gesture information. Or the first condition is that the terminal device detects an unlocking request for a target event.

In an implementation, the processor 601 is further configured to establish the mapping relationship between the first condition and the target biometric recognition pattern prior to enabling the target biometric recognition pattern.

In an implementation, the processor 601 configured to establish the mapping relationship between the first condition and the target biometric recognition pattern is configured to: obtain historical usage data of the terminal device in a preset time period, determine a biometric recognition pattern meeting a second condition and with a usage frequency larger than a first preset threshold as the target biometric recognition pattern, and establish the mapping relationship between the first condition and the target biometric recognition pattern. The historical usage data includes a usage frequency of each biometric recognition pattern with which the terminal device is operable.

In an implementation, the processor 601 configured to establish the mapping relationship between the first condition and the target biometric recognition pattern is configured to: obtain a preset time period that a current moment falls into, obtain a biometric recognition pattern with a usage frequency larger than a first preset threshold, determine a biometric recognition pattern meeting a second condition and with the usage frequency larger than the first preset threshold as the target biometric recognition pattern, and establish the mapping relationship between the first condition and the target biometric recognition pattern.

In an implementation, the historical usage data further includes a usage accuracy of each biometric recognition pattern and the second condition includes that the usage accuracy is larger than a second preset threshold.

Specifically, specific implementations of the each above-mentioned unit can refer to descriptions of related procedures of the implementations corresponding to FIG. 2, FIG. 3, and FIG. 4, which will not be described in detail herein.

As can be seen, when the terminal device detects that the terminal device satisfies the first condition, the terminal device queries the mapping relationship between the first condition and the target biometric recognition pattern. The target biometric recognition pattern is one or more of at least one biometric recognition pattern with which the terminal device is operable. Then the terminal device determines the target biometric recognition pattern based on the mapping relationship and enables the target biometric recognition pattern. It can be seen that, in the implementations of the present disclosure, the terminal device can enable the target biometric recognition pattern directly when detecting that the terminal device satisfies the first condition, which is possible to improve intelligence of enabling a biometric recognition pattern by a terminal device with multiple biometric recognition patterns and facilitate users to use; meanwhile, a high power consumption of the terminal device caused by multiple biometric recognition patterns in a working state can be avoided and battery life of the terminal device can be prolonged.

The implementations of the present disclosure also provide a computer readable storage medium. The computer readable storage medium stores computer programs for electronic data interchange which, when executed, being operable with a computer to accomplish all or part of the operations of any method for enabling a biometric recognition pattern described in the above-described method implementations.

The implementations of the present disclosure also provide a computer program product. The computer program product includes a non-transitory computer readable storage medium for storing computer programs. The computer programs are operable with a computer to perform all or part of the operations of any method for enabling a biometric recognition pattern described in the above method implementations.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be an electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A terminal device, comprising:
    a memory,
    a processor coupled with the memory; and
    a biometric-information receiving device coupled with the processor, wherein the processor is configured to:
        establish a mapping relationship between a first condition and a target biometric recognition pattern, the target biometric recognition pattern being one or more of at least one biometric recognition pattern with which the terminal device is operable;
        wherein the at least one biometric recognition pattern comprises: a fingerprint recognition pattern, an iris recognition pattern, and a face recognition pattern;
        wherein the first condition is one of:
            gesture information of the terminal device matching preset gesture information, and
            the terminal device detecting an unlocking request for a target event,
        query the mapping relationship between the first condition and the target biometric recognition pattern when detecting that the terminal device satisfies the first condition,
        determine the target biometric recognition pattern based on the mapping relationship, and
        enable the target biometric recognition pattern,
    wherein the processor configured to establish the mapping relationship between the first condition and the target biometric recognition pattern is further configured to:
        obtain a preset time period that a current moment falls into;
        determine a biometric recognition pattern meeting a second condition and with a usage frequency larger than a first preset threshold in the preset time period as the target biometric recognition pattern; and
        establish the mapping relationship between the first condition and the target biometric recognition pattern.

2. The terminal device of claim 1, wherein the processor configured to establish the mapping relationship between the first condition and the target biometric recognition pattern is configured to:
    obtain historical usage data of the terminal device in a preset time period, the historical usage data comprising a usage frequency of each biometric recognition pattern with which the terminal device is operable;
    determine a biometric recognition pattern meeting the second condition and with a usage frequency larger than the first preset threshold as the target biometric recognition pattern; and
    establish the mapping relationship between the first condition and the target biometric recognition pattern.

3. The terminal device of claim 2, wherein the historical usage data further comprises a usage accuracy of each biometric recognition pattern, and the second condition comprises: the usage accuracy being larger than a second preset threshold.

4. A method for enabling a biometric recognition pattern, comprising:
    establishing a mapping relationship between a first condition and a target biometric recognition pattern, the target biometric recognition pattern being one or more of at least one biometric recognition pattern with which a terminal device is operable;
    wherein the at least one biometric recognition pattern comprises: a fingerprint recognition pattern, an iris recognition pattern, and a face recognition pattern;
    wherein the first condition is one of:
        gesture information of the terminal device matching preset gesture information; and
        the terminal device detecting an unlocking request for a target event querying the mapping relationship between the first condition and the target biometric recognition pattern when detecting that the terminal device satisfies the first condition;
    determining the target biometric recognition pattern based on the mapping relationship; and
    enabling the target biometric recognition pattern;
    wherein the establishing the mapping relationship between the first condition and the target biometric recognition pattern comprises:
        obtain a preset time period that a current moment falls into;
        determine a biometric recognition pattern meeting a second condition and with a usage frequency larger than a first preset threshold in the preset time period as the target biometric recognition pattern; and
        establish the mapping relationship between the first condition and the target biometric recognition pattern.

5. The method of claim 4, wherein the establishing the mapping relationship between the first condition and the target biometric recognition pattern comprises:

obtaining historical usage data of the terminal device in a preset time period, the historical usage data comprising a usage frequency of each biometric recognition pattern with which the terminal device is operable;

determining a biometric recognition pattern meeting the second condition and with a usage frequency larger than the first preset threshold as the target biometric recognition pattern; and establishing the mapping relationship between the first condition and the target biometric recognition pattern.

6. The method of claim 5, wherein the historical usage data further comprises a usage accuracy of each biometric recognition pattern, and the second condition comprises the usage accuracy being larger than a second preset threshold.

7. A non-transitory computer-readable storage medium storing a computer program which, when executed by a processor, causes the processor to:

establish a mapping relationship between a first condition and a target biometric recognition pattern, the target biometric recognition pattern being one or more of at least one biometric recognition pattern with which a terminal device is operable;

wherein the at least one biometric recognition pattern comprises: a fingerprint recognition pattern, an iris recognition pattern, and a face recognition pattern, wherein the first condition is one of:
gesture information of the terminal device matching preset gesture information, and
the terminal device detecting an unlocking request for a target event, query the mapping relationship between the first condition and theft target biometric recognition pattern when detecting that the terminal device satisfies the first condition;

determine the target biometric recognition pattern based on the mapping relationship; and enable the target biometric recognition pattern;

wherein the computer program executed by the processor to establish the mapping relationship between the first condition and the target biometric recognition pattern is executed by the processor to:

obtain a preset time period that a current moment falls into;

determine a biometric recognition pattern meeting a second condition and with a usage frequency larger than a first preset threshold in the preset time period as the target biometric recognition pattern; and establish the mapping relationship between the first condition and the target biometric recognition pattern.

8. The non-transitory computer-readable storage medium of claim 7, wherein the computer program executed by the processor to establish the mapping relationship between the first condition and the target biometric recognition pattern is executed by the processor to:

obtain historical usage data of the terminal device in a preset time period, the historical usage data comprising a usage frequency of each biometric recognition pattern with which the terminal device is operable;

determine a biometric recognition pattern meeting the second condition and with a usage frequency larger than the first preset threshold as the target biometric recognition pattern; and establish the mapping relationship between the first condition and the target biometric recognition pattern.

* * * * *